United States Patent [19]
Mueller

[11] 3,895,918
[45] July 22, 1975

[54] HIGH EFFICIENCY, THERMAL REGENERATION ANTI-POLLUTION SYSTEM

[76] Inventor: James H. Mueller, 100 E. Hunter Ave., Maywood, N.J. 07607

[22] Filed: Jan. 16, 1973

[21] Appl. No.: 324,230

[52] U.S. Cl. ............. 23/277 C; 23/288 F; 110/8 A
[51] Int. Cl. .......................... F23g 7/06; F23c 9/04
[58] Field of Search ............ 23/277 C, 288 F, 284; 110/8 A

[56] References Cited
UNITED STATES PATENTS

| | | | |
|---|---|---|---|
| 2,730,434 | 1/1956 | Houdry | 23/288 R |
| 2,898,202 | 8/1959 | Houdry et al. | 23/288 F |
| 3,211,534 | 10/1965 | Ridgway | 23/277 C |
| 3,404,965 | 10/1968 | Shiller | 23/288 F |
| 3,615,247 | 10/1971 | Steeves et al. | 23/277 C |
| 3,634,026 | 1/1972 | Kuechler et al. | 23/277 C X |
| 3,698,873 | 10/1972 | Kohayakawa et al. | 23/277 C |
| 3,751,920 | 8/1973 | Rosenlund | 23/277 C X |

Primary Examiner—Morris O. Wolk
Assistant Examiner—Arnold Turk
Attorney, Agent, or Firm—Nelson E. Kimmelman; Allan Ratner; Paul Maleson

[57] ABSTRACT

A thermal regeneration anti-pollution system has a central, generally cylindrical purification chamber operating at a high-temperature to oxidize, burn off, or otherwise thermally process undesired or noxious fumes and odors from industrial or other processes. This chamber is topped by a refractory-lined dome and at its periphery there are a plurality (preferably at least three) of associated flue-heat-exchange bed combinations bounded by vertical walls defining horizontal cross-sections in the general shape of a catenary curve. The heat-exchange bed includes ceramic packing held toward the inner (purification chamber) side by angled louvers. A corresponding plurality of angled vertical baffles are positioned in front of the louvers to lengthen the flow and hence the dwell time of the process gas within the central chamber.

11 Claims, 5 Drawing Figures

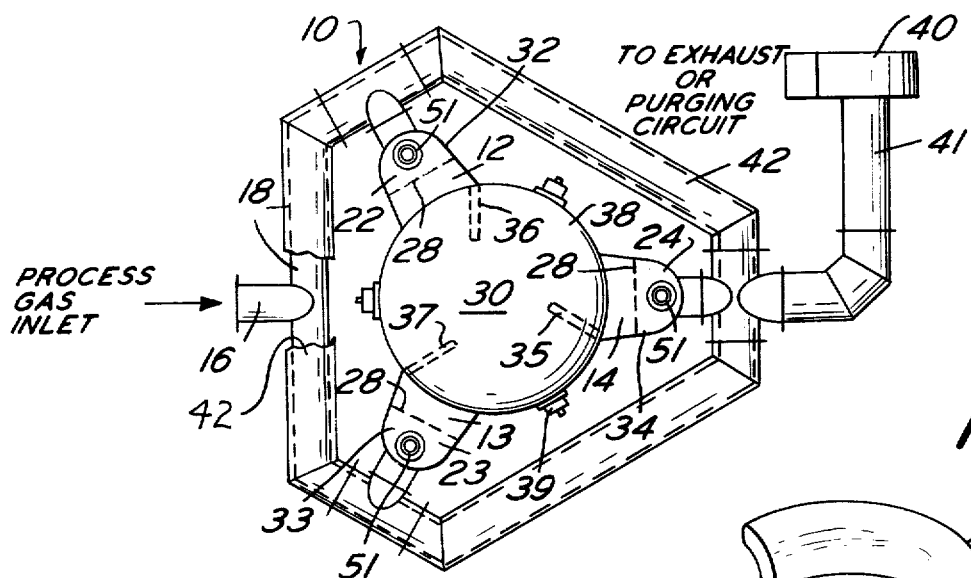
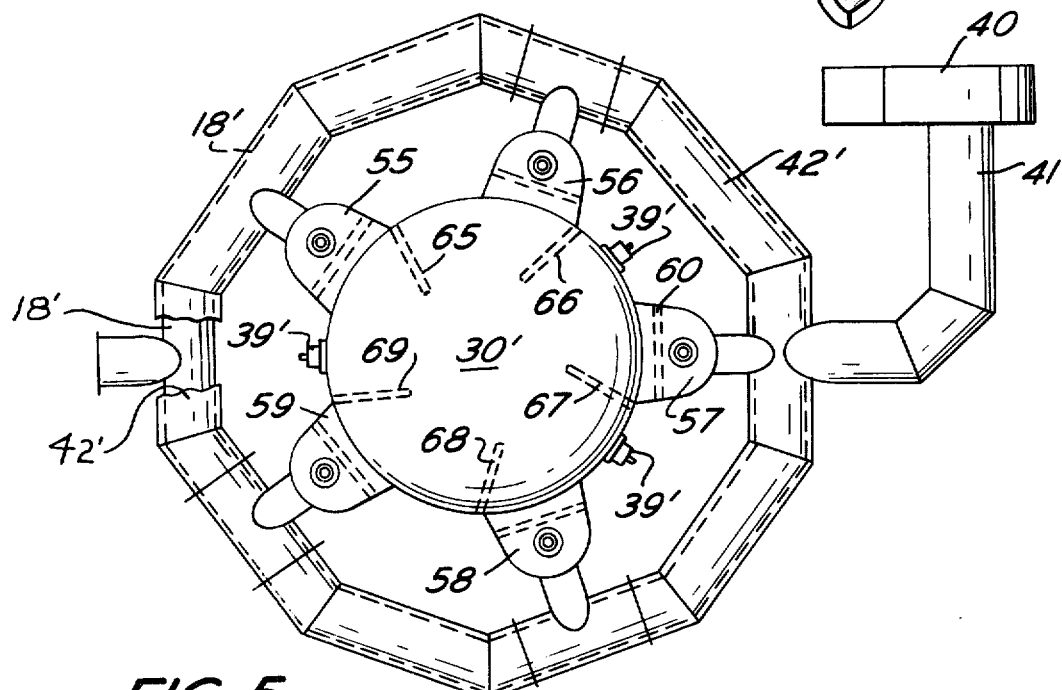

HIGH EFFICIENCY, THERMAL REGENERATION ANTI-POLLUTION SYSTEM

BACKGROUND OF THE INVENTION

1. Field of the Invention

This invention relates to anti-pollution fume and odor control systems and in particular to a novel and improved system for oxidizing or thermally processing noxious fumes and odors using thermal regeneration for conservation of fuel.

2. Prior Art

Apparatus is known which oxidizes or burns off pollutants produced by, for example, industrial plants and which uses the principal of thermal-regeneration. One example of this type of apparatus comprises a plurality of beds of ceramic, heat-exchange elements associated with a corresponding plurality of flues, the bed-flue combinations having flat insulated panels and being arranged in a row spaced from one another. In some of these systems, the heat-exchange elements are constrained on the side closest to the purification chamber by a wall made of stacked ceramic blocks which have been cast with passageways through them. The spaces between the bed-flue combinations contain burners and are used as high temperature purification zones. Over the purification zones or chambers there was suspended a high temperature-resistant roof. The exhaust gas from an industrial process was passed through a selected one of the flue-bed combinations into the high temperature purification chamber by negative pressure produced therein. In that chamber the noxious fumes and odors were oxidized. The very hot effluent was then sucked through two or more other beds thereby heating the heat-exchange elements therein to an elevated temperature while the purified gas had its temperature lowered. In the next part of the cycle, more of the industrial process gas is fed through one of the latter heated beds whereupon it becomes preheated and therefore less heat is required to oxidize its impurities and noxious gases in the purification chamber. When it is thus heated, it is drawn out of the purification chamber through the first bed and another bed thereby heating up the heat-exchange elements in them. Thus when the input process gas is passed through one of the latter two beds into the purification chamber, the gas is preheated in the beds before being subjected to high temperature oxidation. By using at least three flue-bed combinations, it is possible to continuously purify the process gas through appropriate control of the inlet and outlet valves to the flue-bed combinations.

SUMMARY OF THE INVENTION

A thermal-regenerative processing apparatus for processing gas flows having a plurality of spaced, non-parallel heat-exchange beds disposed toward the periphery of a central, high-temperature chamber. Each bed has an inlet and an outlet conduit coupled to it for conducting the process air through it in the desired direction.

BRIEF DESCRIPTION OF THE DRAWINGS

FIG. 1 is a plan view of the one form of the present invention;

FIG. 4 is an enlarged perspective view of one typical element of the heat-exchange packing used in the present invention; and FIG. 5 is a plan view of another embodiment of the present invention.

DETAILED DESCRIPTION OF THE DRAWINGS

Figure 2:
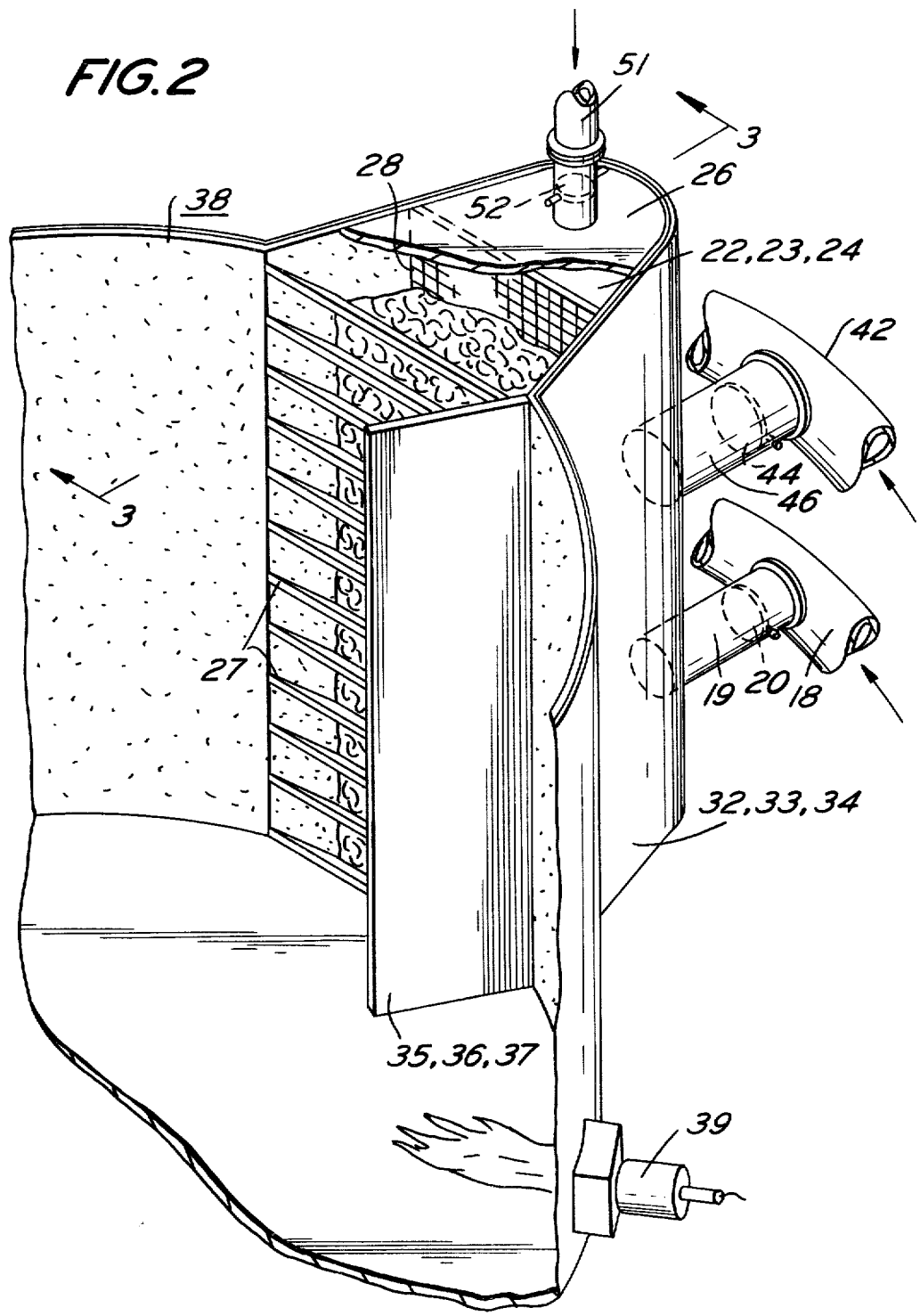
FIG. 2 is an enlarged view in perspective and partially in section, of a portion of the system shown in FIG. 1.
Figure 3:
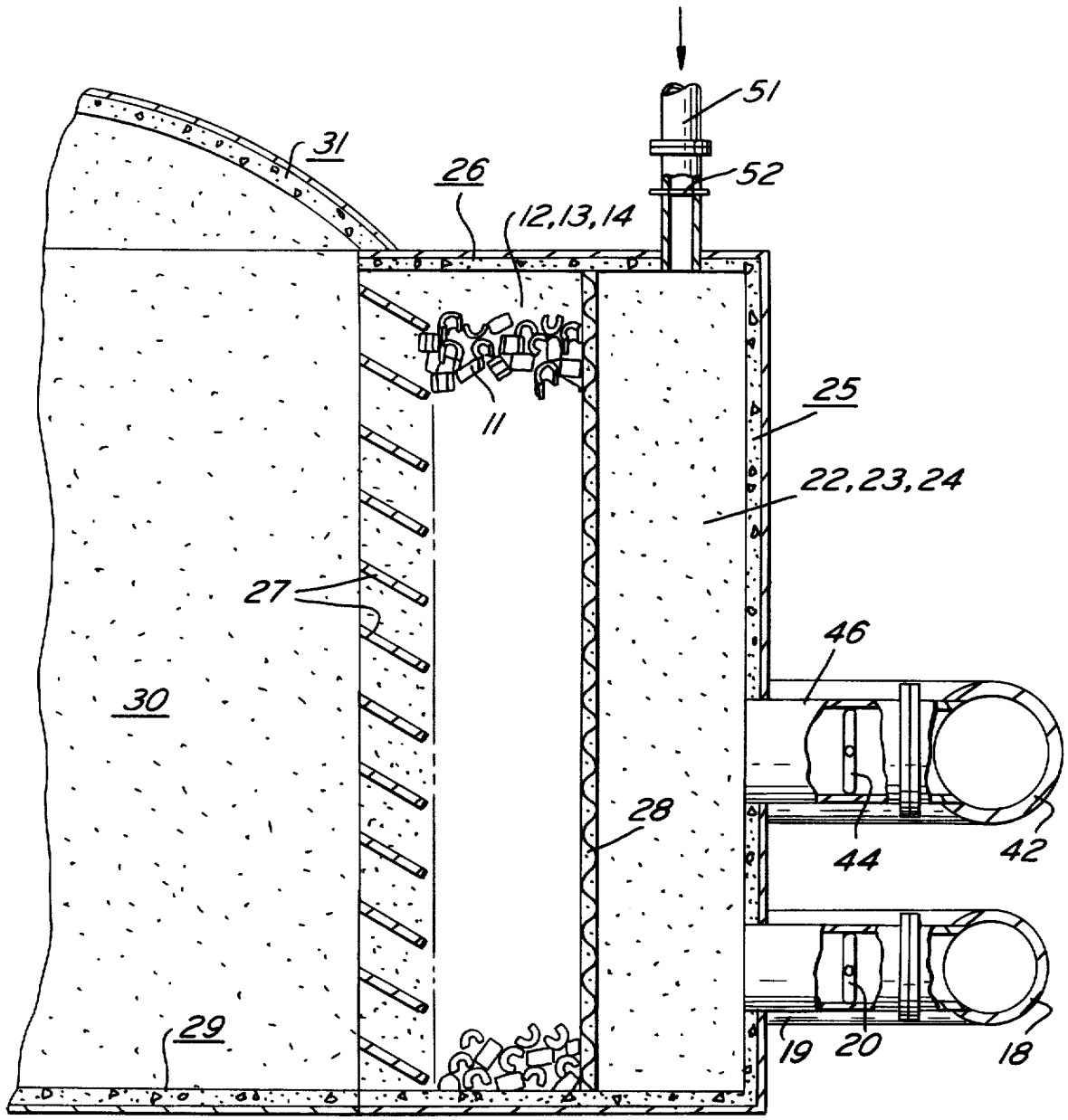
FIG. 3 is a sectional view of the portion of the apparatus shown in FIG. 2 taken along the section line 3—3 in the direction indicated.

Referring now to FIGS. 1–4, there is shown a thermal regenerative anti-pollution system indicated generally at the numeral 10. This system comprises three beds 12, 13 and 14 of heat-exchanging ceramic elements 11 disposed substantially equiangularly around the periphery of a high-temperature purification chamber 30. To these beds exhaust gases from industrial processes, for example, are applied through inlet 16. This inlet is connected to a conduit 18 that can feed the exhaust or process gases to any or all of the heat-exchange beds 12, 13 and 14. The inlet conduit 18 is coupled by pipes 19 to the bottoms of the flues 22, 23 and 24 associated with the beds 12, 13 and 14 respectively. Damper valves 20 are used to control the influx of the process gas to any selected flue or flues and their associated heat-exchange beds. Of course, the valves 20 may be manually controlled but may alternatively be arranged for electromechanical, pneumatic or other operation and programming to follow predetermined cycling as will be explained below. The flue-bed combinations are contained within vertical walled structures 32, 33 and 34 whose horizontal cross-sections are shaped like catenary curves. These curved sections 32, 33 and 34 have walls 25 made of metal lined internally with a refractory or other insulating material.

The beds 12, 13 and 14 are filled with heat-exchanging ceramic or metallic elements 11 such as those commercially available under the trademark "Interlox" or "Super Interlox" made and sold by the Norton Chemical Company, Chemical Products Division. These elements 11 are held at the innermost portion of the bed by a plurality of canted refractory or metallic louvers 27 and by a screen 28 or mesh or louvers on the other side next to the flue. The bed-flue combinations are topped by refractory-lined metallic covers 26.

The incoming gas to be purified after passing through the valve 20 and the pipe 19 enters predetermined ones of the flues 22, 23 and 24, then passes through the screen 28 into and through the beds 32, 33 and 34 depending on the settings of valves 20 and 44. It then is directed outward and upward through a selected one of louvers 27 into the central high temperature purification chamber 30 which is generally cylindrical in cross-section. It is also refractory-lined and topped by a refractory-lined dome 31. Just outside of the louvers there are a plurality of angled gas-deflecting, metallic or other suitable baffles 35, 36 and 37. These baffles tend to lengthen the path of the gas (and consequently its dwell time) within the chamber 30 by deflecting the gas stream laterally. They also assist in keeping the gas from flowing near the cooler inner surfaces of the wall 38 of chamber 30 thereby aiding the gas to attain the maximum temperature before leaving chamber 30.

The chamber 30 is furnished with a plurality of gas, electric or oil burners 39 projecting through apertures formed in the curved wall 38 toward the center of the chamber 30. These burners 39 generate within the chamber 30 a very intense heat of the order of, say, 1400°F.–1800°F. which burns off or carbonizes all of the impurities left in the process gas.

This purified gas is then withdrawn from the chamber 30 through selected ones of the other bed-flue combinations (depending on the settings of valves 20 and 44) by means of negative pressure produced at points therein by the action of exhaust blower 40. Of course, the gases could be driven by positive pressure through the inlet and flue-bed combination, then through the central chamber out through one or more of the other beds. The exhaust of the blower could also be coupled back to the process as well as to ambient or to the purge inlets 51. Blower 40 is connected by conduit section 41 and circular conduit 42, via valves 44 and conduit segments 46, to the flues 22, 23 and 24 at points higher on the vertical walled structures 32, 33 and 34 than the corresponding points at which the pipes 19 are connected. When the purified gas leaves the chamber, it will heat up the elements 11 in the beds through which it passes and will emerge, considerably cooled, from the associated flue into the pipes 46 and, via valves 44 into the conduit 42 and through blower 40. It is seen that these heated beds during the next cycle in which the input process gas is sucked through them, will be pre-heated and therefore less heat will be required within the central chamber 30 to purify it resulting in a considerable fuel saving. As compared with a conventional afterburner system, the fuel costs of the present regenerative system may be as much as one-seventh. While its initial capital cost may be almost twice as much as a conventional afterburner, its maintenance cost may be approximately the same. There may be approximately 24% additional available energy when the present process is used as compared with a conventional afterburner. Even as compared with an afterburner with heat recovery, there are significant advantages in using the present system. While the initial capital cost of the present system may be about 30% more than an afterburner with heat recovery, the present system may obtain 12% more available energy from fuel than the latter. Total operating (annual) savings using the present system may be as much as 66%.

In an actual installation, the operation of the various bed-flue combinations might be cycled as follows:

1. Process fumes are applied via conduit 18 to flue-bed combination 12 through open valve 20 and pipe 19, the inlet valves 20 associated with flue-bed combinations 13 and 14 being closed. Output valve 44 associated with flue-bed 12 is closed whereas the corresponding valves 44 of flue-bed combinations 13 and 14 are kept open so that the latter beds are in communication with the exhaust blower 40. After passage through bed 12 and purification in chamber 30, the process gas, which is heated to about 1500°F. will pass through the beds 13 and 14 into the conduit 42 thereby heating up the ceramic elements 11 to temperatures in the range of 1400°–300°F. The purified gas is cooled considerably by the heat-exchange and passes through the blower 40 to exhaust (or to the purging circuit).

2. During the next part of the cycle, the inlet valve 20 to the bed 12 is closed whereas the inlet valve 20 associated with the bed 13 is open. Similarly, the outlet valves 44 associated with the beds 12 and 14 are opened. Thus, the process gas now enters into the central chamber 30 only through the bed 13 which has been heated up by the previous outflow so that its temperature approaches that of the central combustion chamber 30. It then passes into the high temperature chamber and is purified and then is sucked out through beds 12 and 14 into the outlet conduit 42. Therefore, the bed 12 now has its elements 11 heated again by the outgoing gas and the bed 14, which was also heated during the first part of the cycle, is reheated.

3. During the third part of the cycle, the inlet valve 20 to the bed 14 is the only one opened and its outlet valve 44 is closed whereas the opposite is true for the beds 12 and 13. As a result, the inlet gas passes through the bed 14 and is pre-heated by the heated ceramic elements 11 therein, enters the central purification chamber 30 where its temperature is elevated to around 1400°–1800°F. and then leaves the chamber 30 by the previously heated beds 12 and 13 giving up a considerable portion of its heat energy to those beds before it passes to the exhaust conduit 42 and out through the blower 40.

In passing from one bed to another, the inlet process gas is deflected by the various baffles 35, 36 and 37 which are positioned close by the louvers 27. The result of this deflection is to produce a longer flow path from the inlet bed to the outlet bed or beds during any part of the cycle (for a given exhaust blower speed). This means that the gas will remain in the purification chamber 30 for a longer period of time and thereby tend to have its temperature increased to the fullest extent so that more complete oxidation or purification of the process gas is more likely to occur. Moreover, the baffles tend to keep the flow of pre-heated gas away from the relatively cooler, inside surface of the chamber wall 38 so that the gas may be more easily elevated to the 1400°–1800°F. temperature.

The louvers, by directing the gas to be purified somewhat upwardly toward the dome 31, tend to increase the gas flow path slightly which also increases the "dwell" time of the gas in transit through chamber 30. These louvers 27 being quite simple are also less expensive compared with prior art apparatus which used stacked apertured ceramic blocks. These blocks, because they had to have sufficient structural strength and stability, could not have as large a ratio of open space to solid portions as louvers. Thus, the louvers present less resistance to the gas flow and therefore less pressure drop for the blower to overcome. The louvers also do not have the full pressure of the ceramic elements 11 exerted on them sideways as was the case with the cast ceramic blocks previously used.

The domed roof 31 has great structural strength and resistance to mechanical shock, as is well known. It also tends to intensify the heat within the central part of the chamber 30 by virtue of its curved construction which acts like a focusing radiator to a certain extent. It is also superior to the suspended flat, high-temperature-resistant roof used in previous installations of the thermal regenerative type.

The curved walls of the circular central chamber 30 are made from one or a plurality of large curved metal plates which are simple to assemble. The flat insulated panels used in the prior art between upright structural members required many more discrete elements to orm them and therefore the cost of building the flue-bed combinations of known apparatus was considerably higher than with the present invention.

The present apparatus also is generally shielded by refractory linings on most metal portions. This prevents undue expansion of the metal and damage to it caused by excessive heat, a real problem with the exposed steel surfaces of the prior art.

The curved walls of the flue-bed structures 32, 33 and 34 are simpler and stronger than the right-angle panels formerly used. In addition, since there are fewer junctions and sealing or welding points, there is less possibility of a leak in the present gas system.

Purging

Sometimes when the condition of one of the flue-bed combinations changes, as for example, when the gas flow is to be reversed at the end of a part of the cycle, there is a possibility that some unpurified gas remains in the flue or in the bed at the time of the change. If purified gas is then sucked out through that bed it will carry the unpurified gas out with it through the pipes 46 into conduit 42. In order to prevent this, a number of purging inlets 51 are provided with suitable associated damper valves 52. They are connected at the top of the flue sections through an aperture in the refractory-line covers 25 of the flue-bed combinations. They are all connected to the exhaust side of the blower 40 so that, when the valve 52 is opened, the cooled, purified air which has just been extracted from the apparatus is sent back into a flue through the inlet 51 thereby carrying the unpurified gas into the purification chamber. To illustrate, assume that the flue-bed shown in FIG. 2 has just finished operation in the part of the cycle in which inlet process gases have been applied to it by pipe 19 while the outlet damper 44 was closed. Now the flow of gas through it is to be reversed so that purified gas from the chamber 30 is to pass through the louvers 27, through the bed and into the flue and out by the pipe 46. To prevent the purified air from entraining the trapped impure air in its outward flow the inlet dampers 20 and 44 are closed whereas the purge damper 52 is opened. Thus the cooled, purified gas from the exhaust of blower 40 forces the trapped unpurified gas inwardly from the flue through the bed into the purification chamber 30. After a short interval, the purge damper is closed, the outlet damper is opened and the inlet damper remains closed so the gas flow may safely be reversed without loss of trapped impure gas to the effluent of the system.

Use of warmish gas in the purging operation has a number of advantages over the use of ambient air as a purging agent as disclosed in the prior art. In the first place, since ambient air is much cooler than the air in the blower exhaust and traverses the heated bed, there is some danger that use of ambient air in prior art systems cause thermal shock to the packing material 11. In the second place, the use of ambient air will cool the bed to a lower temperature than the warm exhaust gas from the blower. This means that the purged flue-bed will suffer an unnecessary heat loss thereby requiring more heat from the purified gases in a reverse direction thereby needlessly dissipating heat and tending to waste fuel. In the third place, there is a smaller possibility of condensation of moisture or settling-out of other substances in the flue area using warm gas than is the case with ambient purging.

FIG. 5 shows still another embodiment of the invention which has five flue-bed combinations 55–59 and five associated baffles 65–69 with corresponding inlet and outlet valves (not shown) positioned within inlet and outlet pipes connected to the inlet and outlet conduits 18' and 42'. With this arrangement, the programming of the inlets and outlets from the various flue-bed combinations is a matter of choice so that, for example, flue-bed combinations 57 and 58 might receive process gas whereas flue-combinations 55, 56 and 59 would exhaust the received process gas after it has been purified in the central chamber 30'. The sequence could be by successive rotary steps so that the next two inlet flue-bed combinations 55 and 59 would be actuated during the next cycle, and so on.

In order to enhance the efficiency, reduce fuel costs, and obtain more efficient conversion of noxious gases, the various heat-exchange beds may have associated therewith or incorporated therein bodies of a catalytic material which may be packed in rectangular containers that are inserted from the side, for example, or from the top of the vertical housings for the flue-bed combinations. A location for the catalytic body is indicated between the parallel dotted lines at the numeral 60 in FIG. 5. The catalyst may be any one of the known catalysts suitable for the chemical reaction or process involved, such as the conversion, for example, of nitrous oxides into nitrogen and carbon dioxide. Incorporation of these catalytic agents may also allow the use of less fuel and possibly lower equipment construction costs due to lower operating temperatures. Of course, the particular catalyst used will depend on many things such as the inlet gas temperature, the type of noxious fume being treated, the type and size of the heat-exchange elements 11, etc.

The screens 28, instead of being substantially planar can be curved about their vertical axes so that they are convex as viewed from the chamber 30. This construction gives added strength to resist the laterally-exerted pressure caused by the weight of the elements 11.

Other modifications of the apparatus shown which do not depart from the essence of this invention may occur to one skilled in the art upon perusing this specification and the drawings herein. Consequently, I desire the invention to be limited solely by the claims which follow.

I claim:

1. Apparatus for processing of an industrial exhaust gas flow or the like comprising:
    a. a centrally disposed chamber in which a high temperature range is maintained,
    b. at least three separate, spaced heat-exchange beds disposed substantially equiangularly around and protruding from the periphery of said chamber, each bed containing randomly disposed packing comprised of a plurality of solid heat exchange elements, said beds being bounded by vertical non-parallel walls,
    c. a plurality of inlet means, each being coupled to one of said beds, for conducting said gas flow to said bed for passage through it into said chamber,
    d. a plurality of outlet means, each coupled to one of said beds, for conducting said gas flow away from said bed after the gas flow has passed outwardly through said bed from said central chamber, and
    e. fueled heating means within said chamber for continuously producing or maintaining said high temperature range, said temperature range being considerably higher than the temperature range of the gas flow as it first is applied to the apparatus and sufficiently high to cause continuous thermal oxidation of said gas flow.

2. The apparatus according to claim 1 wherein the walls of said chamber are substantially cylindrical and vertical.

3. The apparatus according to claim 1 wherein said central chamber is topped by a substantially dome-like roof made of refractory material for helping to concentrate radiant heat energy within said chamber.

4. The apparatus according to claim 1 wherein said beds are bounded in part by non-parallel vertical wall sections which diverge as they approach the periphery of said chamber.

5. The apparatus according to claim 1 with the addition of vertical baffles positioned adjacent to the walls of said beds closest to said chamber and angled to deflect gas flow coming through said beds in the same general direction.

6. The apparatus according to claim 1 wherein said heating means comprises a plurality of heating means extending into said chamber at a corresponding plurality of points between said beds.

7. The apparatus according to claim 1 wherein said inlet and outlet means comprise a plurality of flues, each associated with one of said beds and inlet and outlet conduits for each bed respectively coupled to said flues.

8. The apparatus according to claim 7 with the addition of means associated with each flue for recycling gas processed in said apparatus back through said beds into said chamber.

9. The apparatus according to claim 1 wherein each of said beds is bounded on at least one side by a plurality of substantially horizontally disposed louvers.

10. The apparatus according to claim 9 wherein said louvers are angled upwardly toward said chamber.

11. The apparatus according to claim 9 wherein the innermost wall of said beds comprises a plurality of louvers.

* * * * *